July 7, 1970 R. O. WINDER 3,519,941

THRESHOLD GATE COUNTERS

Filed Feb. 23, 1968

INVENTOR
Robert O. Winder

BY

Attorney

United States Patent Office 3,519,941
Patented July 7, 1970

3,519,941

THRESHOLD GATE COUNTERS

Robert O. Winder, Princeton, N.J., assignor to RCA Corporation, a corporation of Delaware Filed Feb. 23, 1968, Ser. No. 707,749
Int. Cl. H03k *23/02, 19/42, 19/44*
U.S. Cl. 328—43 5 Claims

ABSTRACT OF THE DISCLOSURE

Threshold gate counters which produce, on adjacent lines, pulses in time sequence which slightly overlap and which produce, on alternate lines, pulses in time sequence which do not overlap.

BACKGROUND OF THE INVENTION

Copending application, Ser. No. 612,840, now Pat. No. 3,434,058, filed Jan. 31, 1967 by the present inventor and assigned to the same assignee as the present invention, describes threshold gate ring counters which count even numbers of input pulses. The application also discusses prior art threshold gate ring counters which count odd numbers of input pulses. Both the odd and even pulse counters produce pulses which are relatively wide and overlap, in time, relatively large amounts. While counters of these types certainly have many uses, there is also a need for counters which produce shorter pulses which either do not overlap at all, or which only slightly overlap. By using decoder circuits, it is possible to derive from the known counters pulses of these types but this increases the cost of these counters.

The object of the present invention is to provide threshold gate counters which produce directly, that is, without decoders, both pulses which slightly overlap and pulses which do not overlap.

SUMMARY OF THE INVENTION

The counter of the invention includes $n$ threshold gates, where $n$ is an integer. The complemented output of each threshold gate is applied to two of the gates of the counter and the normal output of each gate is applied to two of the gates of the counter. Each gate receives also a trigger pulse and a bias of fixed value.

DETAILED DESCRIPTION

Figure 1:
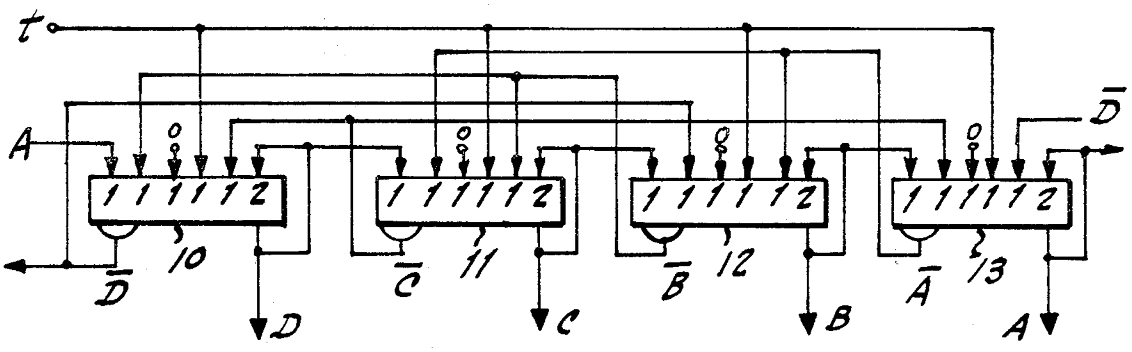
FIG. 1 is a block diagram of a ring counter according to the invention.

The gates of FIG. 1 receive electrical signals which represent binary digits (bits) as inputs and produce electrical signals which represent bits as outputs. To simplify the discussion which follows, the bits themselves are sometime referred to rather than the signals which represent the bits.

The threshold gates shown in FIG. 1 are, in themselves, known. Each such gate is a majority-minority gate. Each gate has a threshold of four, has a total of seven input weights and produces a normal and a complementary output. More specifically, if four or more of the input weights represent the bit 1, the normal output of the gate represents the bit 1 and the complemented output represents the bit 0; if four or more of the input weights represent the bit 0, the normal output of the gate represents a 0 and the complemented output represents a 1. The numbers within the blocks of FIG. 1 represent the weights accorded the respective inputs. Thus, for example, in gate 10, the signal D has twice the effect on the operation of the gate as any other input such as $t$. Circuits for gates of the general type shown in FIG. 1 are discussed in the references cited in the copending application.

The circuit of the present invention is applicable to any number of input gates, odd or even, greater than 3. For purposes of illustration, an even number (four) of such gates 10–13 are shown. In general, the number of such stages is $n$, the number of states which are possible in a counting loop of interest is $2n$ and the number of pulses which are counted is $n$. The ring counter shown counts four trigger pulses $t$ and in this process assumes eight different states.

In the circuit of FIG. 1, the normal output of each gate is applied back to the same gate with weight 2 and is applied also to the next gate forward (to the right as viewed in the drawing with weight 1. The complemented output of each gate is applied to the next gate behind it and to the gate spaced two gates forward both with weight 1. A trigger pulse $t$ is applied to all gates and a constant bias of the same value is applied to all gates, both with weight 1. While the bias is shown to be a 0, the bias could be a 1 instead and in this case outputs complementary to those shown in FIG. 2 would be obtained.

In more mathematical terms, the circuit of FIG. 1 can be described as follows:

(1) The complementary output $\bar{x}_j$ of the $j$th gate is applied to the $$j \overset{\ominus}{_n} 1\text{th}$$

gate and the $$j \overset{\oplus}{_n} 2\text{th}$$

gate, both with weight 1.

(2) The normal output $x_j$ of each $j$th gate is applied to the $j$th gate with weight 2 and to the $$j \overset{\oplus}{_n} 1\text{th}$$

gate, with weight 1.

(3) A trigger pulse $t$ is applied to all gates, with weight 1.

(4) A constant bias representing a bit of given value is applied to all gates, with weight 1.

The symbols above have the following meanings:

$\overset{\ominus}{_n}$ represents modulo $n$ subtraction, $\overset{\oplus}{_n}$ represents modulo $n$ addition, and $n$ is equal to the number of stages in the counter and also to the counting base.

The operation of the counter is succinctly given in Table I below:

TABLE I

| t | D | C | B | A |
|---|---|---|---|---|
| 0 | 1 | 0 | 0 | 0 |
| 1 | 1 | 1 | 0 | 0 |
| 0 | 0 | 1 | 0 | 0 |
| 1 | 0 | 1 | 1 | 0 |
| 0 | 0 | 0 | 1 | 0 |
| 1 | 0 | 0 | 1 | 1 |
| 0 | 0 | 0 | 0 | 1 |
| 1 | 1 | 0 | 0 | 1 |
| 0 | 1 | 0 | 0 | 0 |

The discussion which follows shows, by a number of examples, how the values above are arrived at. Assume first that the circuit is in the first state shown, that is, DCBA=1000. Assume now the trigger pulse $t$ changes from 0 to 1. The inputs to gate 10 are $A=0$, $\bar{B}=1$, bias=0, $\bar{C}=1$, $D=1$ and $t=1$. Therefore, five of the seven input weights are 1 and the D remains 1. The inputs to gate 11 are $D=1$, $\bar{A}=1$, $t=1$, $\bar{B}=1$. Thus, four of the seven input weights are equal to 1 so that C changes from 0 to 1. Analysis, in a similar manner, of stages 12 and 13 shows that their states remain unchanged, that is, B and A both remain 0.

Assume now that $t$ changes to 0 (this is the third line of the table). Now $A=0$, $\overline{C}=0$, bias=0 and $t=0$. Thus, four of the seven input weights to gate 10 have the value 0 so that D changes from 1 to 0. Similar analysis of stages 11–13 will show that their outputs remain unchanged at $C=1$, $B=0$ and $A=0$.

Figure 2:
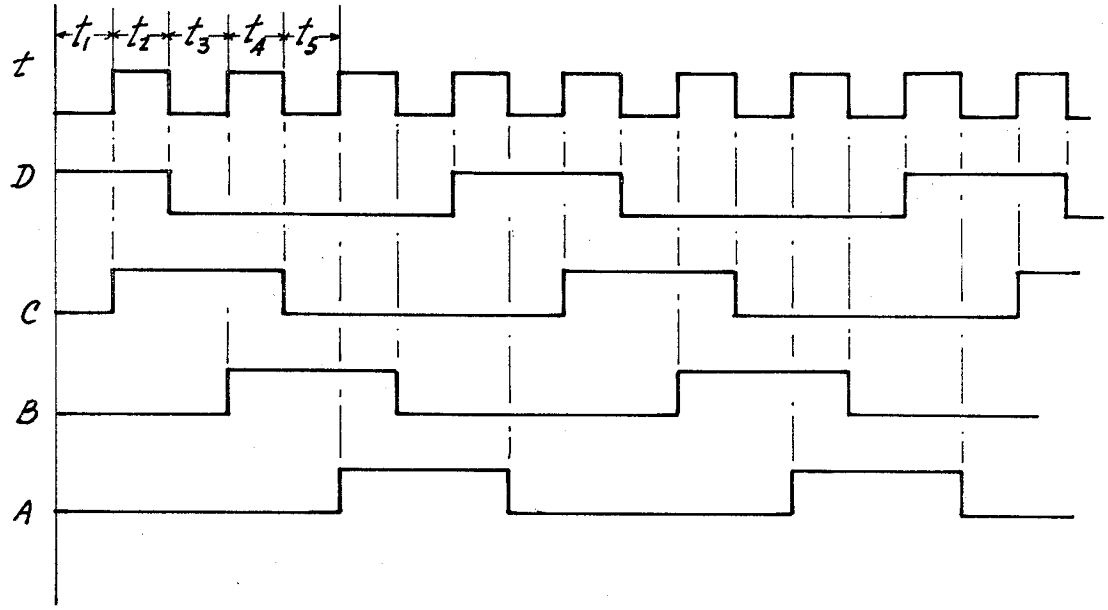
FIG. 2 is a drawing of waveforms to help explain the operation of the circuit of FIG. 1.

The operation of the circuit of FIG. 1 is also depicted in FIG. 2. Here, the assumption arbitrarily is made that a positive-going signal represents the bit 1 and a negative-going signal, the bit 0. The time period $t_1$ corresponds to the first line of Table I, the time period $t_2$ to the second line and so on. Note that the pulses produced on adjacent lines of the threshold gate counter slightly overlap in time. For example, the $C=1$ pulse starts when the greater part of the $D=1$ pulse has been completed. The $B=1$ pulse starts when the greater part of the $C=1$ pulse has been completed and so on. In the embodiment shown, the 1 and 0 portions of the trigger pulse wave are of equal duration and in this case each pulse overlaps the next adjacent pulse by one-third, however, different amounts of overlap, greater or less than one-third, may be achieved by making the 1 and 0 periods of the trigger pulse wave unequal in the appropriate sense. The circuit also has the property that the pulses on alternate lines do not overlap at all. If, for example, one assumes the pulse C to have a duration of three time intervals, the pulse A does not start until one time interval after the pulse C has been completed.

The pulses generated by the circuit of FIG. 1 are all of the same duration and the count produced is in a unit-distance code, that is, each number generated by the counter differs from the preceding number only by a change in the value of one bit. It is clear that the pulses shown may be used directly as, for example, timing or control pulses for a digital computer, and in many other applications.

While the invention is illustrated in terms of a four stage ring counter, it is also useful as a storage circuit such as a shift register or the like. These circuits are exactly the same as the one shown in FIG. 1 except that there is no feedback connection from the last stage to the first stage. The free connections at the first and last stages such as those shown receiving the bits A and D, in the case of a shift register, would receive instead control or information pulses.

The circuit of FIG. 1 readily may be reset. One way this may be accomplished is to maintain $t=0$ and to apply a 0 to all of the input leads A, B, C and D. This resets all stages to 0. Then a 1 is applied to one of the outputs changing the value of that output to a 1. It may be observed from Table I that there are four states which are possible in the counter loop of interest, in which one bit has the value 1 and three bits the value 0.

While only one counting loop has been discussed for the circuit of FIG. 1, there are other counting states in other loops which are possible and the circuit may, in special applications, employ one or more of these other counting states. However, the present counting loop is of special interest as it does produce a particularly useful set of outputs, as already discussed,

What is claimed is:

1. A threshold gate counter comprising in combination:
- $n$ threshold gates, each having a normal and a complemented output, where $n$ is an integer greater than 3;
- means for applying the normal output of each gate to two gates of said counter;
- means for applying the complemented output of each gate to two gates of said counter;
- means for applying a fixed bias representing a binary digit to all gates of said counter, and
- means for applying trigger signals to all gates of said counter.

2. A threshold gate counter as set forth in claim 1, wherein one of said gates to which said normal output is applied is the same gate that produces said output.

3. A threshold gate counter as set forth in claim 2, wherein said normal output is applied with a given weight to a gate other than the one producing said output and with a greater weight to itself, and wherein said complemented output is applied to two gates other than the one producing said complemented output.

4. A threshold gate counter comprising:
- $n$ majority-minority gates, each with a threshold of four and with seven input weights;
- means for applying the complementary output $\overline{x}_j$ of each $j$th gate to the $$j \underset{n}{\ominus} 1\text{th and the } j \underset{n}{\oplus} 2\text{th}$$

gates, both with weight 1;
- means for applying the normal output $x_j$ of each $j$th gate to the $j$th gate with weight 2 and to the $$j \underset{n}{\oplus} 1\text{th}$$

gate with weight 1;
- means for applying a trigger pulse to all gates with weight 1; and
- means for applying a constant bias to all gates with weight 1, where:
  - $n$ is an integer greater than 3,
  - $j$ is an integer having the successive values from 1 to $n$,
  - $\underset{n}{\oplus}$ represents modulo $n$ addition, and
  - $\underset{n}{\ominus}$ represents modulo $n$ subtraction

5. A threshold gate counter as set forth in claim 4 wherein said constant bias has a value representing the bit 0.

References Cited

UNITED STATES PATENTS

| | | | |
|---|---|---|---|
| 3,234,401 | 2/1966 | Dinman | 307—211 X |
| 3,253,158 | 5/1966 | Horgan | 307—223 X |
| 3,308,384 | 3/1967 | Wright | 328—37 X |
| 3,456,126 | 7/1969 | Kaplan | 307—211 |

DONALD D. FORRER, Primary Examiner

STANLEY D. MILLER, Assistant Examiner

U.S. Cl. X.R.

307—211, 221, 223; 328—92